United States Patent
Cao et al.

(10) Patent No.: US 7,360,016 B2
(45) Date of Patent: Apr. 15, 2008

(54) METHOD OF PROTECTING DATA IN CACHE MEMORY OF STORAGE SYSTEM

(75) Inventors: Cang-Mou Cao, Tianjin (CN); Xing-Jia Wang, Tianjin (CN); Jian-Feng Guo, Tianjin (CN); Yi Chen, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 184 days.

(21) Appl. No.: 11/407,212

(22) Filed: Apr. 20, 2006

(65) Prior Publication Data

US 2007/0260922 A1  Nov. 8, 2007

(51) Int. Cl.
*G06F 12/02* (2006.01)
(52) U.S. Cl. .................. 711/113; 711/141; 711/162; 711/165
(58) Field of Classification Search ............. 711/113, 711/141, 154, 162, 165
See application file for complete search history.

(56) References Cited

U.S. PATENT DOCUMENTS

2003/0041280 A1*  2/2003  Malcolm et al. ............... 714/4
2007/0245110 A1*  10/2007  Shibayama et al. ......... 711/165

* cited by examiner

*Primary Examiner*—Jack Lane
(74) *Attorney, Agent, or Firm*—Birch, Stewart, Kolasch & Birch, LLP

(57) ABSTRACT

A method of protecting data in the cache memory of a storage system is used to protect the data stored in the cache memory of a first storage system and a second storage system coupled together and with the battery backed function. When the first storage system and the second storage system function normally, the data in their cache memory are mutually backed up. When any of the storage system has a power failure situation, the other normal storage system takes over the malfunctioned storage device. The data in its own cache memory are protected using the battery backed function. After the malfunctioned storage system restarts, the two storage systems keep backing up the data in the cache memory of each other. This provides a thorough protection of the data in the cache memory of the storage systems, increasing the reliability thereof.

4 Claims, 7 Drawing Sheets

METHOD OF PROTECTING DATA IN CACHE MEMORY OF STORAGE SYSTEM

BACKGROUND OF THE INVENTION

1. Field of Invention

The invention relates to a data protection method and, in particular, to the method of protecting the data in the cache memory of a storage system.

2. Related Art

In this era with explosive information, new information technologies are continuously introduced. The increasing needs for data storage have spurred tremendous progress in storage devices and storage techniques, both playing important roles in the information technologies. Network storage techniques, particularly the storage area network (SAN), have wide applications.

The SAN is a network different from the local area network (LAN) or the wide area network (WAN). It is used to connect resources coupled to a server. High transmission rates (at the order of Gigabits/sec) among the internal storage devices, high extensibility, and high reliability are some of its features. In addition to hardware, the SAN has devoted software for managing, monitoring, and configuring the systems.

In the storage system of the SAN, a disk cache, that is a write-back cache, is used to increase the system efficiency. When a write operation is carried on for a device, once the location and size in the random access memory (RAM), the name of the device to be written, and the location in the device for the data are written into the disk cache, the user considers that the operation is finished. Then the devoted read/write device of the system completes the write operation for the data stored in the disk cache at appropriate time, periodical, or the system resources of the RAM being insufficient. However, the data in the disk cache is remained. When a read operation is carried on for the device, the system first determines whether the data to be read are already in the disk cache. If so, the data are extracted directly. Otherwise, the data are read from the storage device and added to the disk cache. To increase the read/write efficiency of block device, the driver thereof usually adopts some special algorithm, such as the elevator algorithm, pre-reading algorithm, and delayed writing algorithm.

Each disk cache item in the operating system (OS) of the storage system represents a physical memory page or block. In the storage system, the disk cache item has a fixed size. Its serial number can be obtained by using the formula (location of the disk cache in the RAM)/(size of the disk cache).

Using the write-back cache enables the storage system to store the data that are already written in the disk cache but not in the storage device. If the storage system is power failure, the data in the disk cache will be lost.

Therefore, to increase the reliability of the SAN, the prior art provides some battery backed RAM solutions. However, these methods are independent and have limited protections for the storage system.

SUMMARY OF THE INVENTION

To solve the problems and drawbacks in the prior art, an object of the invention is to provide a method of protecting data in cache memory of a storage system. It is used to protect the data stored in the cache memory of a first storage system and a second storage coupled together and with a battery backed function.

The disclosed method of protecting data in cache memory of a storage system includes the following steps. First, operation status of the first storage system is detected. An area in the RAM of the second storage system is reserved. Then the system checks whether the first storage system is power failure. When the first storage system functions normally, the operation of the disk cache of the first storage system is monitored. Following a set of rules, the data in the second storage system corresponding to the data in the disk cache of the first storage system are stored or deleted. When the first storage system is power failure, the data stored in the disk cache of the second storage system is written into a storage device. The storage device of the first storage system is controlled by the second storage system. The data of the disk cache of the first storage system stored in the second storage system are written into the storage device of the first storage system. The second storage system provides a server function for the first storage system. Afterwards, the server function detects whether the first storage system resumes. When the first storage system resumes, the server function for the first storage system is stopped. The data of the storage device of the first storage system stored in the disk cache of the second storage system are written into the storage device of the first storage system. The second storage system stops controlling the storage device of the first storage system. The data of the disk cache of the second storage system are written into the storage device of the second storage system, removing the information stored in the reserved area. If the first storage system does not resume, operations on the disk cache of the second storage system are monitored. Following the set of rules, the corresponding information of the disk cache items is stored or deleted from the reserved area. The system then detects whether the second storage system is power failure. When the second storage system is power failure, the battery backed function provides power for the RAM of the second storage system. When the second storage system resumes, the information of the disk cache items stored in the reserved area is read according to the data corresponding to the locations of the information, stored in the RAM. Finally, when the second storage system resumes, the information of the disk cache items stored in the reserved area is read, and the data stored at the corresponding locations in the RAM are written into the corresponding storage device in accord with the information.

In order to effectively protect the data in the cache memory of the second storage system, the disclosed method further includes the following steps. The operation of the second storage system is detected. An area is reserved in the RAM of the first storage system. Afterwards, the system detects whether the second storage system is power failure. When the second storage system functions normally, the second storage system monitors operations of the disk cache of the second storage system. Following a set of rules, the data in the first storage system corresponding to the data in the disk cache of the second storage system are stored or deleted. When the second storage system is power failure, the data stored in the disk cache of the first storage system is written into a storage device. The storage device of the second storage system is controlled by the second storage system. The data of the disk cache of the second storage system stored in the first storage system are written into the storage device of the second storage system. The first storage system provides a server function for the second storage system. Afterwards, the server function detects whether the second storage system resumes. When the second storage system resumes, the server function for the second storage system is stopped. The data of the storage device of the second storage system stored in the disk cache of the first storage system are written into the storage device of the second storage system. The first storage system stops controlling the storage device of the second storage system. The data of the disk cache of the first storage system are written into the storage device of the first storage system, removing the information stored in the reserved area. If the second storage system does not resume, operations on the disk cache of the first storage system are monitored. Following the set of rules, the corresponding information of the disk cache items is stored or deleted from the reserved area. Then whether the first storage system has a power failure is detected. When the first storage system is power failure, the battery backed function provides power for the RAM of the first storage system. When the first storage system resumes, the information of the disk cache items stored in the reserved area is read according to the data corresponding to the locations of the information stored in the RAM. Finally, when the first storage system resumes, the information of the disk cache items stored in the reserved area is read, and the data stored at the corresponding locations in the RAM are written into the corresponding storage device in accord with the information.

In summary, the advantage of the invention is that both storage systems protect the data stored in the cache memory of each other. When any one storage system has an abnormal power failure situation, the other normal storage system takes over the storage device of the abnormal storage system. The battery backed function of the normally functioning storage system protects the data in its own cache memory. This greatly increases the reliability of the storage systems.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
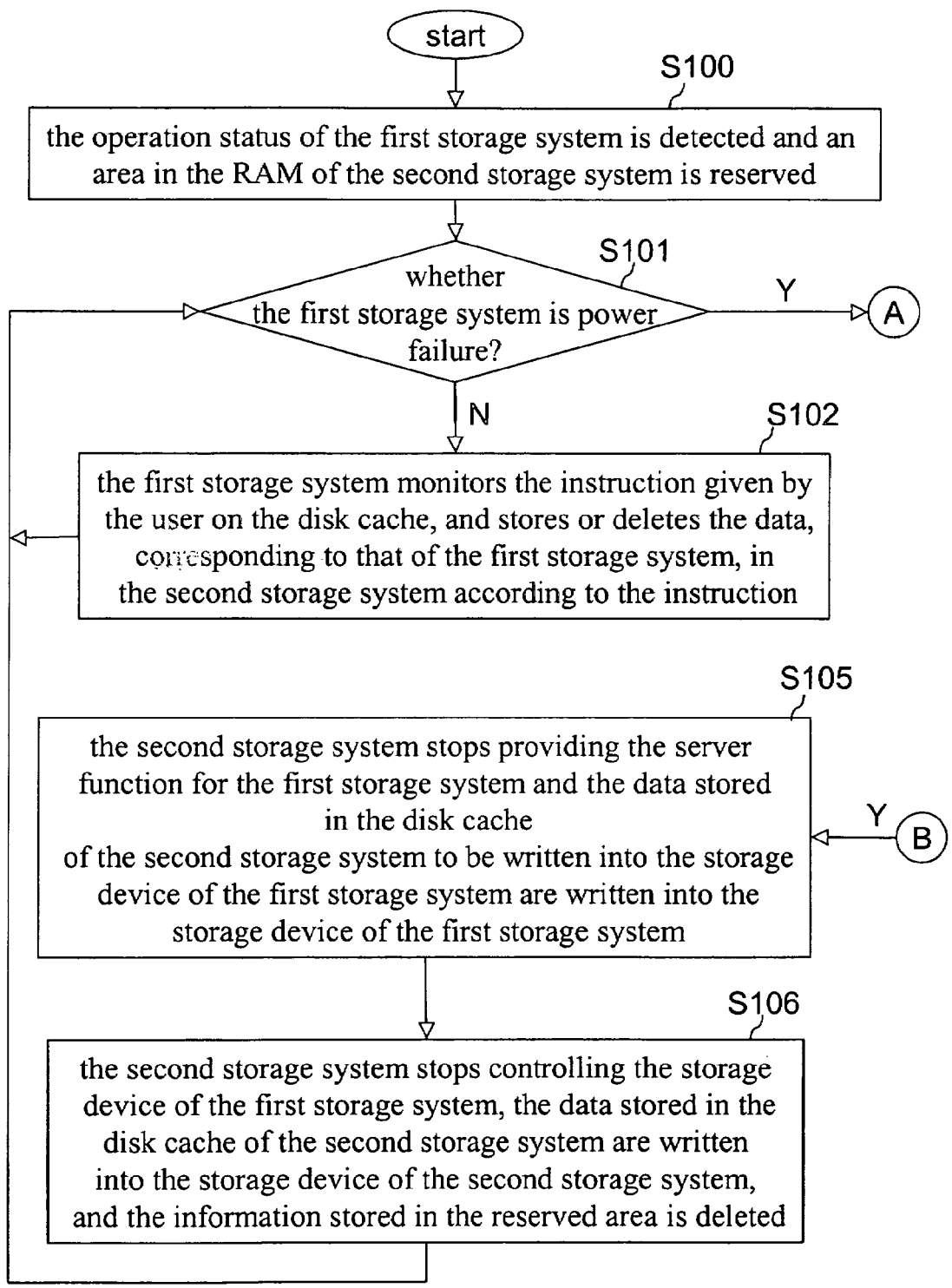
FIG. 1a and FIG. 1b are flowcharts showing the method of protecting data in the cache memory of a first storage system according to the invention.
Figure 1B:
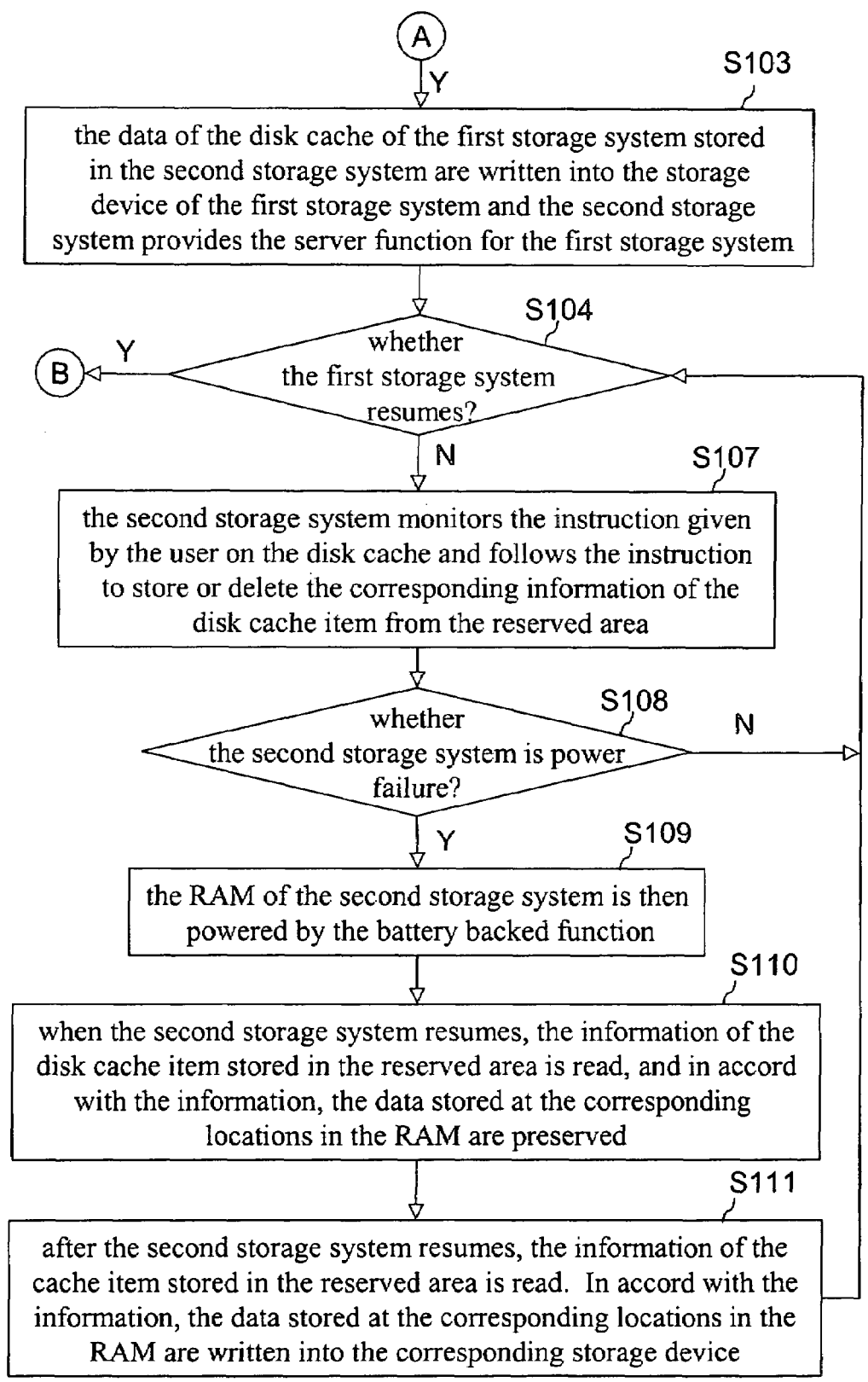
Figure 3:
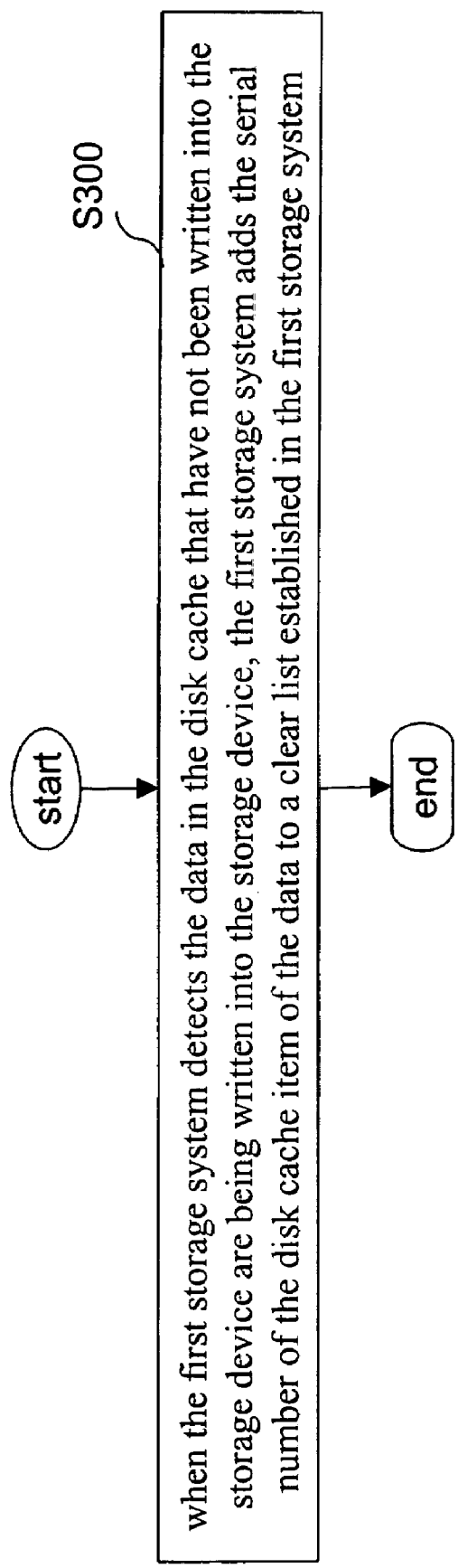
FIG. 3 is a flowchart showing how the system monitors the process of writing data in the disk cache, that have not been written into the storage device, into the storage device.
Figure 4:
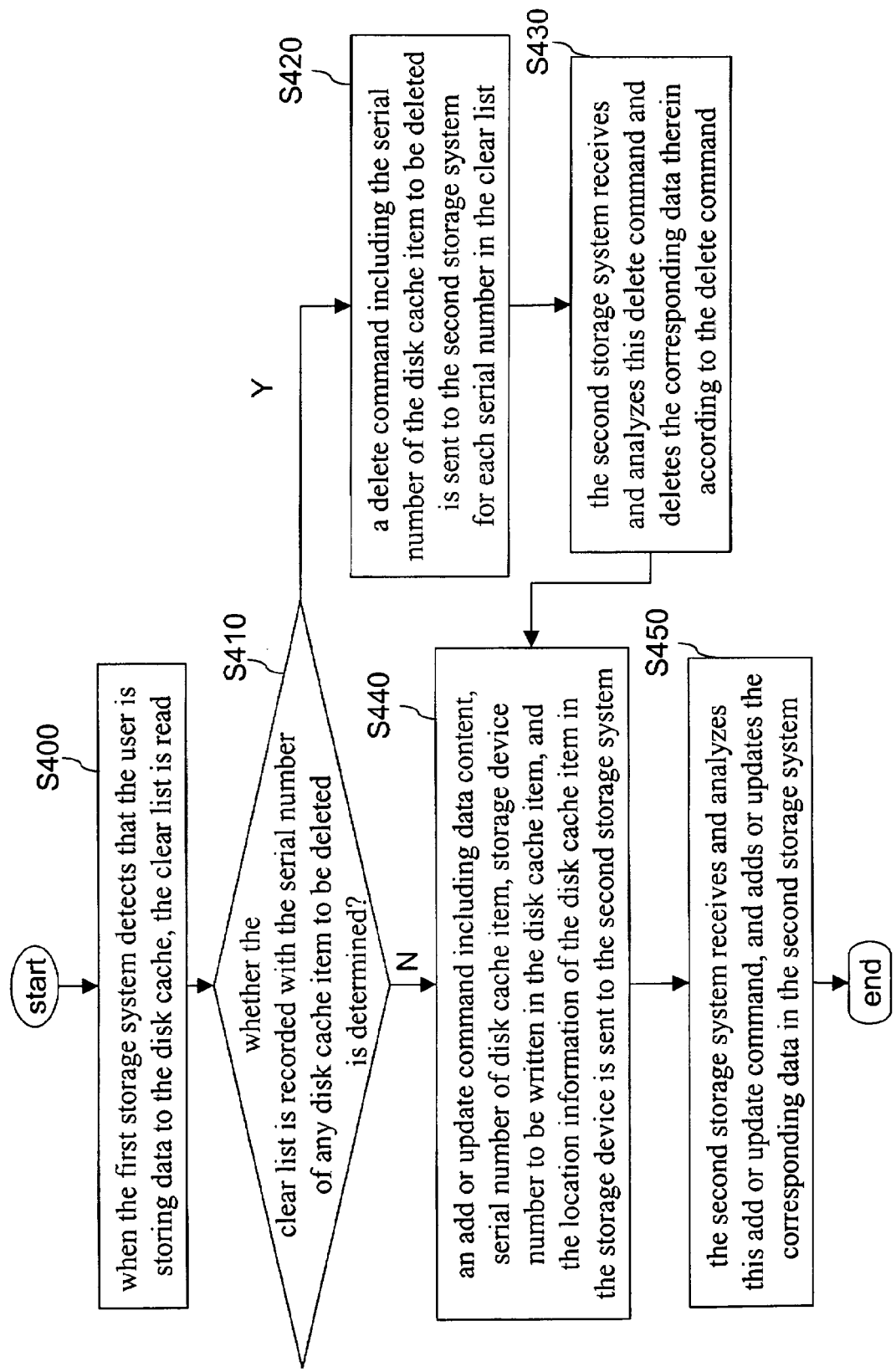
FIG. 4 is a flowchart showing how the system monitors the process of writing user's data to the disk cache.
Figure 5:
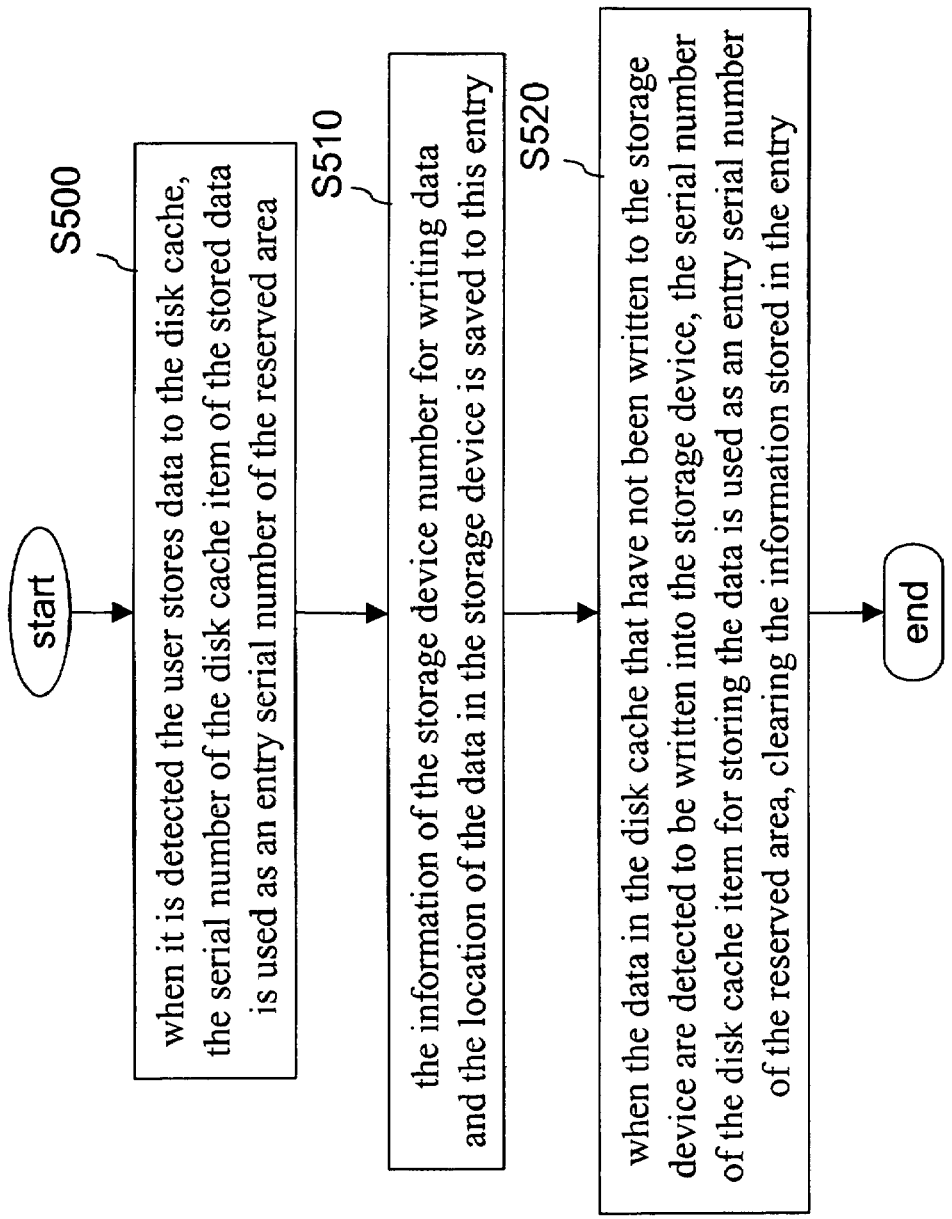
FIG. 5 is a flowchart showing how the information of the disk cache items are stored into or deleted from the reserved area.

Please refer to FIGS. 1a, 1b, 3, 4, and 5. FIG. 1a, 1b are flowcharts showing the method of protecting data in the cache memory of a first storage system according to the invention. FIG. 3 is a flowchart showing how the system monitors the process of writing data in the disk cache, that have not been written into the storage device, into the storage device. FIG. 4 is a flowchart showing how the system monitors the process of writing user's data to the disk cache. FIG. 5 is a flowchart showing how the information of the disk cache items are stored into or deleted from the reserved area. As shown in the drawing, a preferred embodiment of the invention includes the following steps.

A first storage system and a second storage system are two storage systems in a SAN that are coupled via an internal high-speed network. When both the first storage system and the second storage system start, the parameter settings for RAM self test in the basic input/output system (BIOS) of the second storage system are set to preserve the data stored in the RAM of the second storage system. An area is reserved in the RAM of the second storage system. After the first and second storage systems start, the second storage system receives the heartbeat signal sent by the first storage system via the internal high-speed network, thereby detecting the operation status of the first storage system (S100) and determining whether the first storage system is power failure (S101)?

When the first storage system functions normally, the first storage system monitors the instruction given by the user on the disk cache, and stores or deletes the data, corresponding to that of the first storage system, in the second storage system according to the instruction (S102). It further includes the following steps. When the first storage system detects the data in the disk cache that have not been written into the storage device are being written into the storage device, the first storage system adds the serial number of the disk cache item of the data to a clear list established in the first storage system (S300), as shown in FIG. 3. When the first storage system detects that the user is storing data to the disk cache, the clear list is read (S400). As shown in FIG. 4. Whether the clear list is recorded with the serial number of any disk cache item to be deleted is determined (S410)? If there is no record, then step S440 is executed directly. Otherwise, a delete command including the serial number of the disk cache item to be deleted is sent to the second storage system for each serial number in the clear list (S420). The second storage system receives and analyzes this delete command and deletes the corresponding data therein according to the delete command (S430). Afterwards, an add or update command including data content, serial number of disk cache item, storage device number to be written in the disk cache item, and the location information of the disk cache item in the storage device is sent to the second storage system (S440). The second storage system receives and analyzes this add or update command, and adds or updates the corresponding data in the second storage system (S450). At the same time, the second storage system continues executing step S101 in order to make immediate response once power failure occurs to the first storage system.

When the first storage system is power failure, the data stored in the disk cache of the second storage system are written into its storage device. Then, the second storage system takes over the storage device of the first storage system. Afterwards, following the records, the data of the disk cache of the first storage system stored in the second storage system are written into the storage device of the first storage system. The second storage system provides the server function for the first storage system (S103). At the same time, the second storage system continuously detects whether the first storage system resumes (S104).

When the second storage system detects that the first storage system resumes, the second storage system stops providing the server function for the first storage system and the data stored in the disk cache of the second storage system to be written into the storage device of the first storage system are written into the storage device of the first storage system (S105). Afterwards, the second storage system stops controlling the storage device of the first storage system. The data stored in the disk cache of the second storage system are written into the storage device of the second storage system. The information stored in the reserved area is deleted, and the space of the RAM of the second storage system is released (S106). In this case, both the first storage system and the second storage system function normally. The second storage system continues with step S101.

When the first storage system does not resume, the second storage system monitors the instruction given by the user on the disk cache and follows the instruction to store or delete the corresponding information of the disk cache item from the reserved area (S107). It further includes the following steps, as shown in FIG. 5. When it is detected the user stores data to the disk cache, the serial number of the disk cache item of the stored data is used as an entry serial number of the reserved area (S500). The information of the storage device number for writing data and the location of the data in the storage device is saved to this entry (S510). When the data in the disk cache that have not been written to the storage device are detected to be written into the storage device, the serial number of the disk cache item for storing the data is used as an entry serial number of the reserved area, clearing the information stored in the entry (S520). At the same time, the second storage system continuously monitors whether it is power failure (S108)? If no power failure occurs to the second storage system, step S104 follows.

If the second storage system is power failure, the RAM of the second storage system is then powered by the battery backed function, preserving data stored in the RAM. The CPU of the second storage system is provided with some short-term power, so that the CPU can complete the task of synchronizing the CPU cache data with the RAM of the second storage system (S109). When the second storage system resumes, the information of the disk cache item stored in the reserved area is read. In accord with the information, the data stored at the corresponding locations in the RAM are preserved (S110). After the second storage system resumes, the information of the cache item stored in the reserved area is read. In accord with the information, the data stored at the corresponding locations in the RAM are written into the corresponding storage device (S111). In this case, the second storage system functions normally and continues with step S104.

According to the above description, when the disk cache of the first storage system functions normally, its data are backed up continuously by the second storage system, keeping the consistency of the data. When the first storage system is power failure, the second storage system takes over the storage device of the first storage system, and writes the backup data back to the storage device of the first storage system. At the same time, the second storage system uses its battery backed function to protect the data stored in its disk cache in case of power failure. Therefore, the disk cache data in the first storage system and the second storage system within the same SAN are well protected.

Figure 2A:
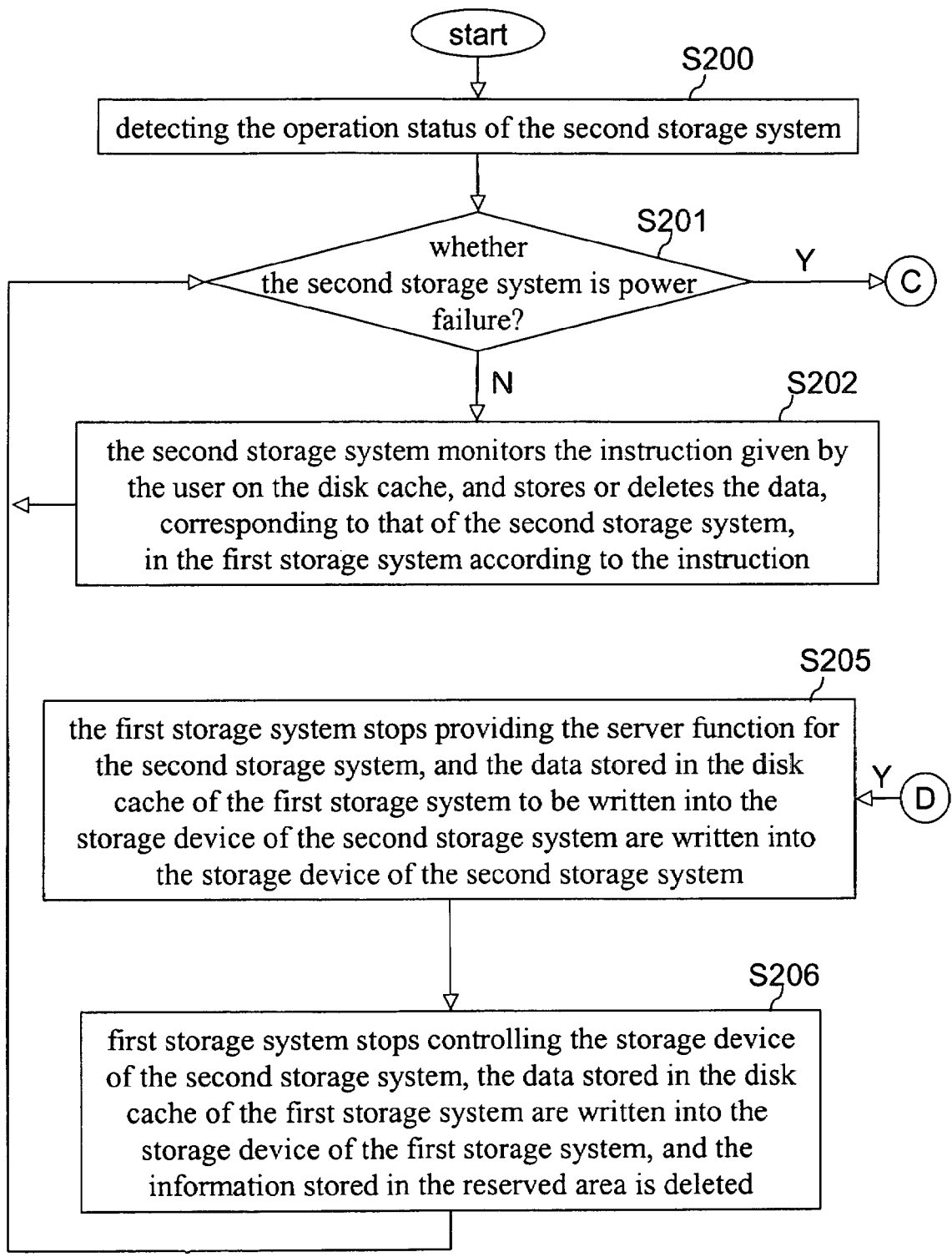
FIG. 2a and FIG. 2b are flowcharts showing the method of protecting data in the cache memory of a second storage system according to the invention.
Figure 2B:
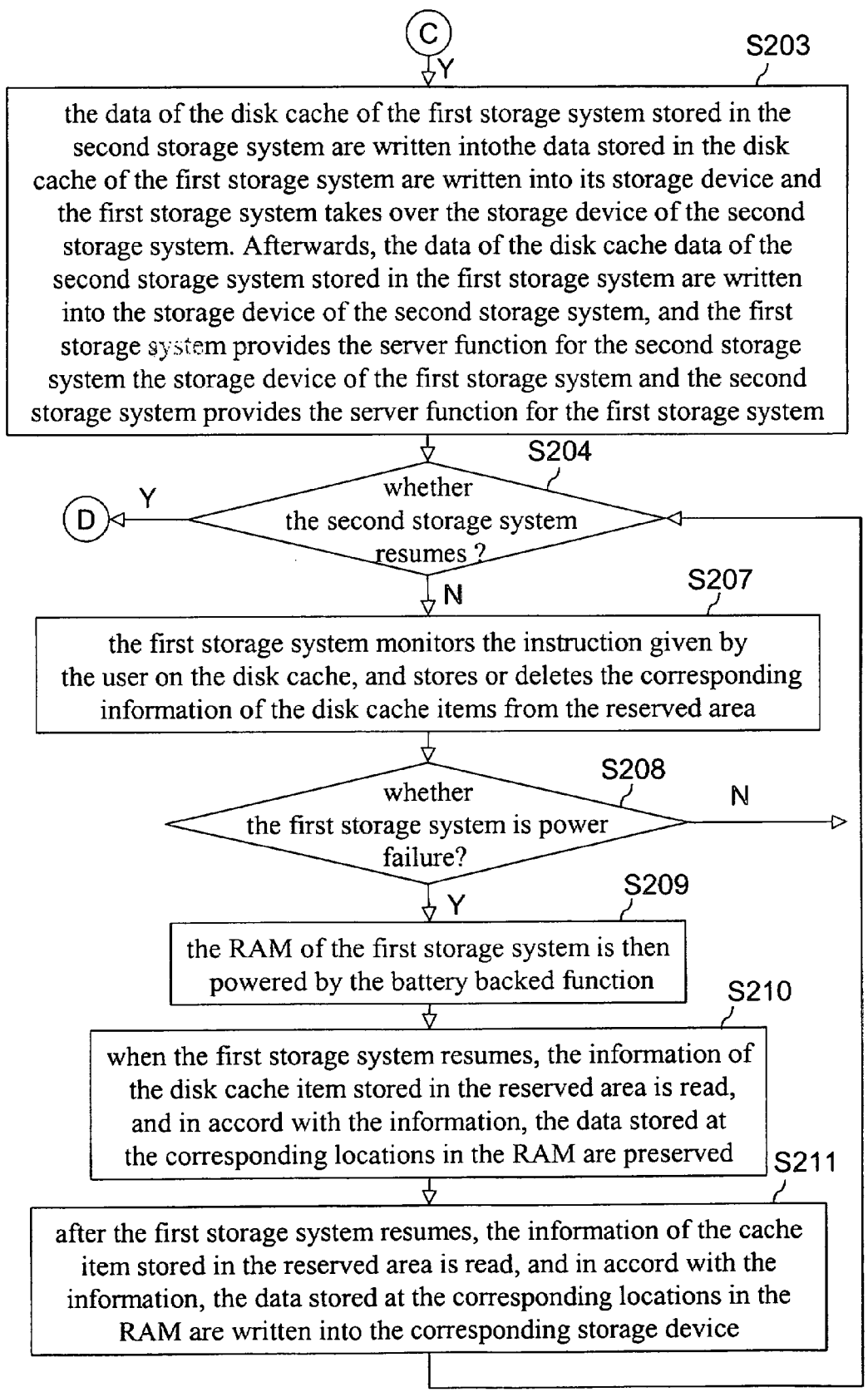

With reference to FIG. 2a and FIG. 2b, the invention further includes the following steps. A first storage system and a second storage system are two storage systems in a SAN that are coupled via an internal high-speed network. When both the first storage system and the second storage system start, the parameter settings for RAM self test in the basic input/output system (BIOS) of the first storage system are set to preserve the data stored in the RAM of the first storage system. An area is reserved in the RAM of the first storage system. After the first and second storage systems start, the first storage system receives the heartbeat signal sent by the second storage system via the internal high-speed network, thereby detecting the operation status of the second storage system (S200) and determining whether the second storage system is power failure (S201)?

When the second storage system functions normally, the second storage system monitors the instruction given by the user on the disk cache, and stores or deletes the data, corresponding to that of the second storage system, in the first storage system according to the instruction (S202). The detailed description of implementing this step is already given in FIGS. 3 and 4. It is not repeated here again.

When the second storage system is power failure, the data stored in the disk cache of the first storage system are written into its storage device. The first storage system takes over the storage device of the second storage system. Afterwards, following the records, the data of the disk cache data of the second storage system stored in the first storage system are written into the storage device of the second storage system. The first storage system provides the server function for the second storage system (S203). At the same time, the first storage system continuously detects whether the second storage system resumes (S204)?

When the first storage system detects that the second storage system resumes, the first storage system stops providing the server function for the second storage system. The data stored in the disk cache of the first storage system to be written into the storage device of the second storage system are written into the storage device of the second storage system (S205). Afterwards, the first storage system stops controlling the storage device of the second storage system. The data stored in the disk cache of the first storage system are written into the storage device of the first storage system. The information stored in the reserved area is deleted, and the space of the RAM: of the first storage system is released (S206). In this case, both the first storage system and the second storage system function normally. The first storage system continues with step S201.

When the second storage system does not resume, the first storage system monitors the instruction given by the user on the disk cache, and stores or deletes the corresponding information of the disk cache items from the reserved area (S207). This step is detailed in FIG. 5 and is not repeated herein again. At the same time, the first storage system continuously detects whether the first storage system is power failure (S208)? If the first storage system does not have a power failure situation, then step S204 is followed.

If the first storage system is power failure, the RAM of the first storage system is then powered by the battery backed function, preserving data stored in the RAM. The CPU of the first storage system is provided with some short-term power, so that the CPU can complete the task of synchronizing the CPU cache data with the RAM of the first storage system (S209). When the first storage system resumes, the information of the disk cache item stored in the reserved area is read. In accord with the information, the data stored at the corresponding locations in the RAM are preserved (S210). After the first storage system resumes, the information of the cache item stored in the reserved area is read. In accord with the information, the data stored at the corresponding locations in the RAM are written into the corresponding storage device (S211). In this case, the first storage system functions normally and continues with step S204.

According to the above description, when the disk cache of the second storage system functions normally, its data are backed up continuously by the first storage system, keeping the consistency of the data. When the second storage system has a power failure, the first storage system takes over the storage device of the second storage system, and writes the backup data back to the storage device of the second storage system. At the same time, the first storage system uses its battery backed function to protect the data stored in its disk cache in case of power failure. Therefore, the disk cache data in the first storage system and the second storage system within the same SAN are well protected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of protecting data in the cache memory of a storage system for protecting data in the cache memory of a first storage system and a second storage system coupled together and with a battery backed function, a method comprising the steps of:
   (a) detecting the operation status of the first storage system and reserving an area in the random access memory (RAM) of the second storage system;
   (b) monitoring an instruction given by a user on the disk cache of a first storage system and storing/deleting the data, corresponding to the data stored in the disk cache of the first storage system, in an second storage system according to an instruction;
   (c) when the first storage system is power failure, writing the data stored in the disk cache of the second storage system into the storage device thereof and controlling the storage device of the first storage system by the second storage system, writing a data of the disk cache of the first storage system stored in a second storage system into the storage device of the first storage device, and providing a server function to the first storage system through the second storage system;
   (d) monitoring the instruction given by the user on the disk cache of the second storage system and storing/deleting the corresponding information of the disk cache item from the reserved area according to the instruction;
   (e) using the battery backed function to provide power to the RAM of the second storage system when the second storage system is power failure;
   (f) reading the information of the disk cache item stored in the reserved area and preserving the data stored at the corresponding location in the RAM in accord with the information when the second storage system resumes;
   (g) reading the information of the disk cache item stored in the reserved area and writing the data stored in the corresponding location of the RAM into the corresponding storage device in accord with the information after the second storage system resumes;
   (h) stopping the server function of the first storage system and writing the data that are stored in the disk cache of the second storage system and need to be written into the storage device of the first storage system into the storage device of the first storage system after the first storage system resumes; and
   (i) stopping the control of the storage device of the first storage system by the second storage system, writing the data stored in the disk cache of the second storage system into the storage device of the second storage system, removing the information stored in the reserved area, and executing step (a).

2. The method of claim 1 further comprising the steps of:
   (a') detecting the operation status of the second storage system and reserving an area in the random access memory (RAM) of the first storage system;
   (b') monitoring the instruction given by the user on the disk cache of the second storage system and storing/deleting the data, corresponding to the data of the disk cache of the second storage system, in the first storage system according to the instruction;
   (c') writing the data stored in the disk cache of the first storage system into the storage device thereof and controlling the storage device of the second storage system by the first storage system, writing the data of the disk cache of the second storage system stored by the first storage system into the storage device of the second storage device, and providing a server function to the second storage system through the first storage system when the second storage system is power failure;
   (d') monitoring the instruction given by the user on the disk cache of the first storage system and storing/deleting the corresponding information in the disk cache item from the reserved area;
   (e') using the battery backed function to provide power to the RAM of the first storage system when the first storage system is power failure;
   (f') reading the information of the disk cache item stored in the reserved area and preserving the data stored at the corresponding location in the RAM in accord with the information when the first storage system resumes;
   (g') reading the information of the disk cache item stored in the reserved area and writing the data stored in the corresponding location of the RAM into the corresponding storage device in accord with the information after the first storage system resumes;
   (h') stopping the server function of the second storage system and writing the data that are stored in the disk cache of the first storage system and need to be written into the storage device of the second storage system into the storage device of the second storage system after the second storage system resumes; and
   (i') stopping the control of the storage device of the second storage system by the first storage system, writing the data stored in the disk cache of the first storage system into the storage device of the first storage system, removing the information stored in the reserved area, and executing step (a').

3. The method of claim 1, wherein step (b) further includes the steps of:
   adding the serial number of the disk cache item for storing the data to a clear list established in the first storage system when the data in the disk cache of the first storage system that are not written into the storage device are detected to be written into the storage device;

reading the clear list when it is detected that the user stores data to the disk cache;

sending a delete command including the serial number of the disk cache item to be deleted for each serial number in the clear list to the second storage system when the clear list has a record of the serial number of the disk cache item to be deleted;

receiving and analyzing the delete command, and deleting the corresponding information stored in the second storage system in accord with the delete command;

sending an add/update command including data contents, the serial number of the disk cache item, the storage device number to be written into the disk cache item, and the location information of the storage device to the second storage system in accord with the detected add/update operation; and receiving and analyzing the add/update command, and adding/updating the corresponding data in the second storage system in accord with the add/update command.

4. The method of claim 1, wherein step (d) further includes the steps of:

using the serial number of the disk cache item for storing the data as an entry serial number of the reserved area when it is detected that the user stores data to the disk cache;

storing the information including the storage device number for writing data and the location of the data in the storage device to the entry; and using the serial number of the disk cache item for storing the data as an entry serial number of the reserved area, and deleting the information stored in the entry when the data in the cache memory that have not been written into the storage device are detected to be written to the storage device.

* * * * *